March 10, 1970 D. KAHNG 3,500,142

FIELD EFFECT SEMICONDUCTOR APPARATUS WITH MEMORY INVOLVING ENTRAPMENT OF CHARGE CARRIERS

Filed June 5, 1967 2 Sheets-Sheet 1

INVENTOR
D. KAHNG
BY
Arthur J. Torsiglieri
ATTORNEY

United States Patent Office 3,500,142

Patented Mar. 10, 1970

3,500,142

FIELD EFFECT SEMICONDUCTOR APPARATUS WITH MEMORY INVOLVING ENTRAPMENT OF CHARGE CARRIERS

Dawon Kahng, Somerville, N.J., assignor to Bell Telephone Laboratories, Incorporated, Murray Hill, N.J., a corporation of New York Filed June 5, 1967, Ser. No. 643,659
Int. Cl. H01l *11/14, 3/12*
U.S. Cl. 317—235 10 Claims

ABSTRACT OF THE DISCLOSURE

A field effect transistor is provided with a gate electrode assembly comprising a sandwich of a metallic layer between two insulating films of appropriate characteristics for the entrapment of charge carriers in the metallic layer. Such entrapment provides memory whereby an induced electric field can be maintained in the semiconductive element even after the field inducing force is removed.

Figure 1:
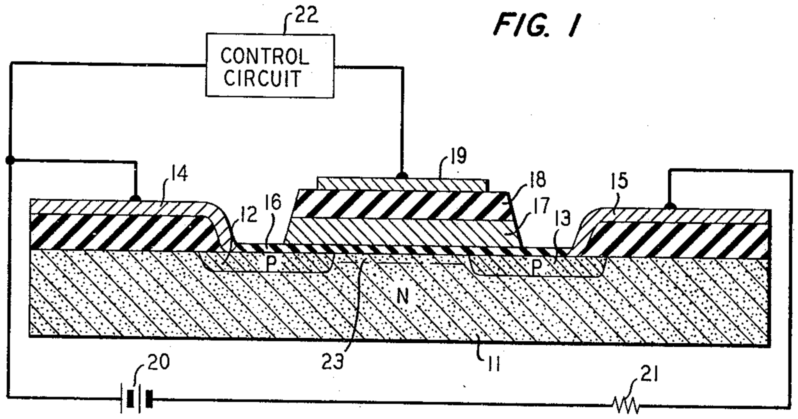

This invention relates to semiconductive apparatus which is characterized by relatively long memory, i.e., apparatus which will persist in a certain induced state for a useful period of time even after the inducing force is removed whereby there is provided for such period a record of the characteristics of the inducing force.

In computers and related apparatus there exists a need for memory elements in which information can be stored temporarily, while remaining accessible for reading, and then readily erased or modified.

Hitherto there have been suggested semiconductive devices having memory in which the memory was achieved by the provision of a ferroelectric element in contact with the semiconductive wafer such that the direction of the remanent polarization of the ferroelectric element controlled the state of the device. Typical of such devices are those described in U.S. Patent 2,791,760. An advantage of these devices is that the memory is independent of any sustaining currents so that even if there is a temporary loss of power the stored information is not lost. A serious difficulty that has hampered the exploitation of devices of this kind is that presently available ferroelectrics tend to suffer mechanical damage with use and after suffering such damage are of limited reliability. Also, the inherent speed capability is limited by the domain motion which is relatively slow, and so it is difficult to realize very fast switching.

To this end, the invention provides a semiconductive device with memory, in which the need for a ferroelectric element is obviated by a novel gate assembly which makes use of trapped charge carriers. In particular, viewed from one aspect, the gate assembly typically will comprise a pair of insulating layers sandwiching a metallic layer in which the charges are trapped. Viewed from another aspect, the gate assembly will include a tunnel sandwich diode formed by two conductive elements sandwiching an insulating layer sufficiently thin that electron transport or tunneling therethrough is realized under control of applied signal information.

In a typical insulated gate field effect transistor embodiment of the invention, the semiconductive element is a silicon wafer the bulk of which is weakly n-type and which includes a pair of spaced p-type surface zones to which are connected the source and drain electrodes, respectively. The surface portion of the element intermediate such p-type zones is covered with a relatively thin layer of silicon oxide which together with a relatively thick outer layer of zirconium oxide sandwiches a layer of zirconium therebetween which serves as a floating gate. A metallic layer covers the zirconium oxide to serve as the outer gate electrode. In operation, a positive voltage pulse applied to the outer gate electrode causes the entrapment of electrons in the zirconium layer for a relatively long time, which results in a p-type skin persisting underneath the silicon oxide and a low resistance path between the source and drain electrodes. The application of a negative pulse instead results in leaving the portion of the element underlying the silicon oxide n-type whereby the resistance between the source and drain electrodes is high.

A variety of embodiments will be described hereinafter including ones in which light may be employed for releasing charges trapped in the floating gate and thereby affecting the resistance between the source and drain electrodes.

Figure 3:
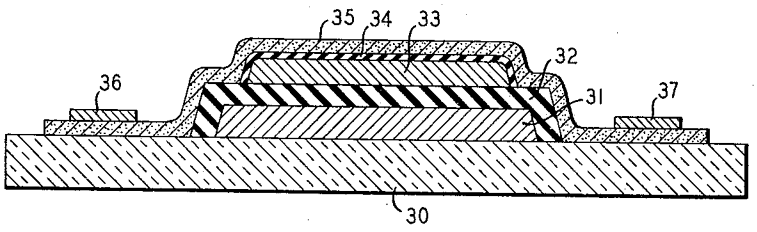
Figures 4, 5:
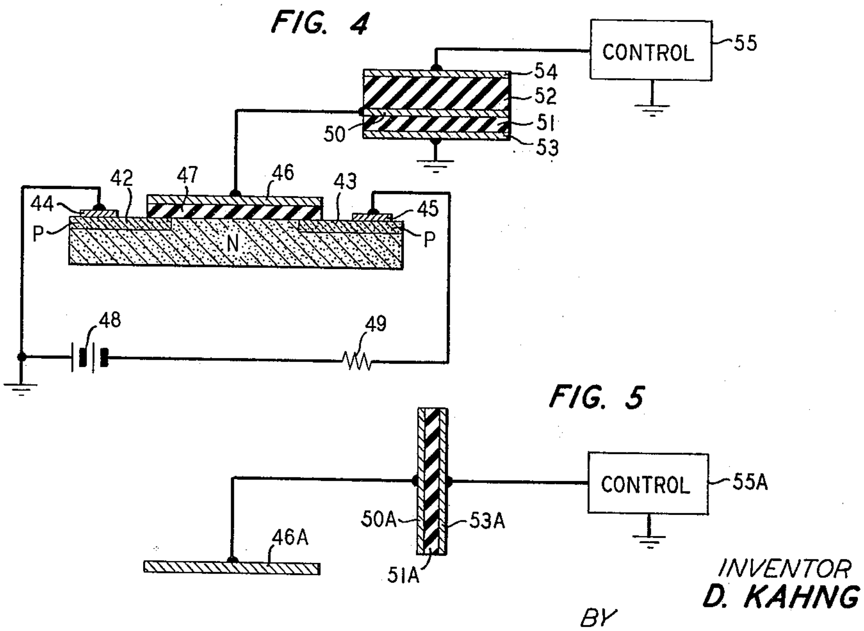
Figures 2A, 2B, 2C:
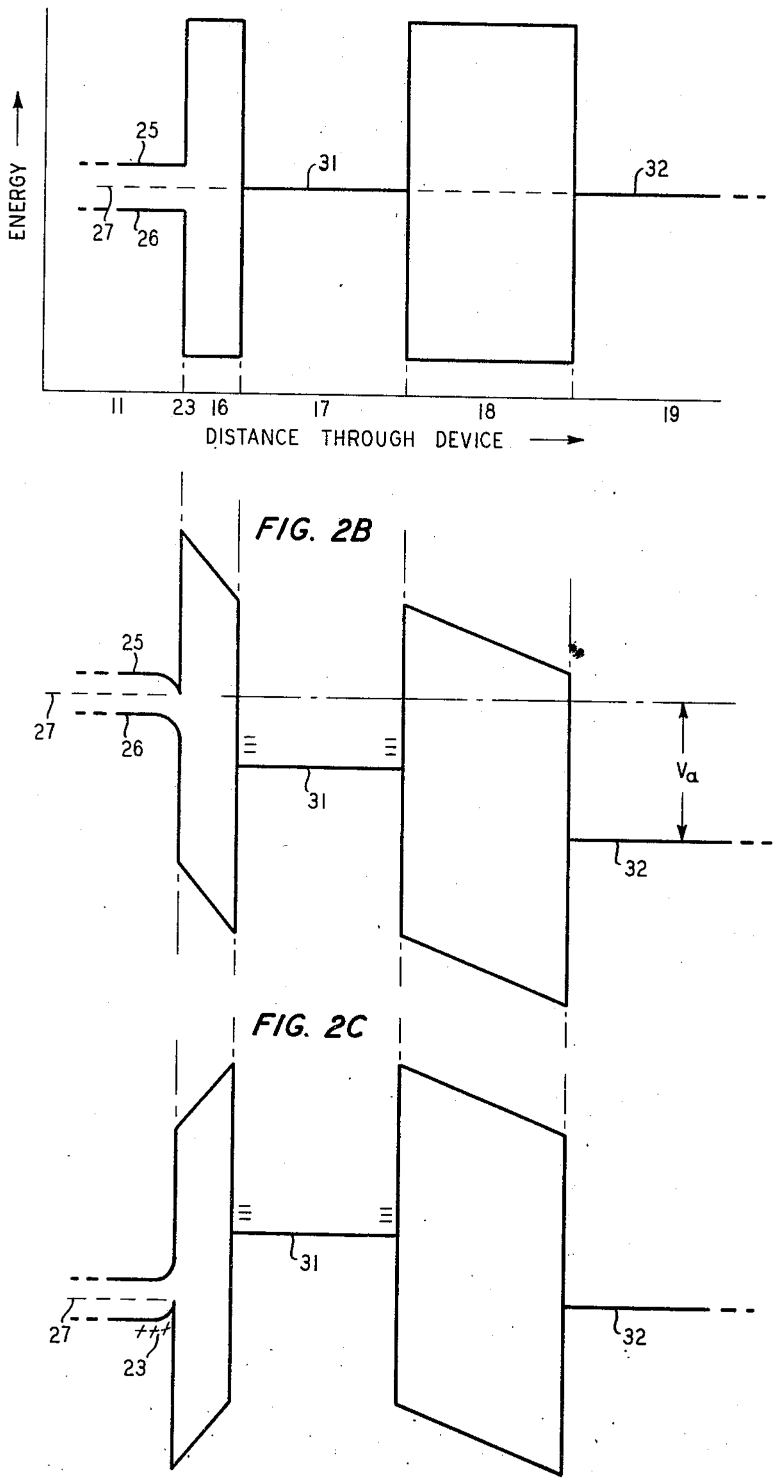

The invention will be described more fully with reference to the drawing in which:

FIG. 1 shows schematically an insulated gate field-effect transistor embodiment of the invention incorporated in a typical circuit;

FIGS. 2A, 2B, and 2C are energy level diagrams useful in explaining the trapping mechanism involved in the embodiment shown in FIG. 1;

FIG. 3 shows a section of a thin film transistor embodiment of the invention; and FIGS. 4 and 5 show an embodiment of the invention in which the gate assembly includes two separate portions.

With reference now to the drawing, in the memory cell shown in FIG. 1, a monocrystalline semiconductive element, the bulk 11 of which is weakly n-type, also includes spaced, localized, p-type surface zones, 12, 13. Electrodes 14 and 15 make low resistance connections to zones 12 and 13 and serve as the source and drain electrodes, respectively. Overlying the surface between zones 12 and 13 is the gate assembly comprising a relatively thin insulating layer 16 contiguous to the surface, an inner metallic layer 17, a relatively thick outer insulating layer 18, and an outer metallic layer 19. Layer 18 is also chosen to have a higher dielectric constant than layer 16. As seen, the metallic layer 17 is sandwiched between layers 16 and 18, and is insulated from the outer layer 19 and the semiconductive element. It will be convenient to refer to inner layer 17 as the floating gate and outer layer 19 as the terminal gate. It will also be apparent that insulating layer 16 is sandwiched between the semiconductive element 11 and the metal layer 17 to form a "tunnel sandwich diode" because as will be explained hereinafter the operation depends on electron tunneling through layer 16 under control of signal information.

In one embodiment constructed, the element 11 was primarily n-type silicon with a resistivity of about 1 ohm-centimeter. The layer 16 was about 50 angstroms thick and of silicon dioxide thermally grown, the layer 17 was of zirconium and about 1000 angstroms thick, the layer 18 was of zironium oxide about 1000 angstroms thick, and the layer 19 and the electrodes 14 and 15 were of aluminum. The p-type zones 12 and 13 were spaced apart about 0.5 mil.

A voltage source 20 and load 21 are connected serially between source and drain electrodes 14 and 15. The control voltage source 22 is connected between the source electrode 14 and the terminal gate electrode 19.

For the specific design previously described, a voltage pulse of about fifty volts with a width of 0.5 microsecond was used to store $5 \times 10^{12}$ electrons per square centimeter on the floating gate, which was adequate to cause the desired silicon surface layer inversion.

In operation, depending on the polarity of the most recent control voltage pulse provided by source 22, the surface portion 23 of the element extending between zones 12 and 13 and underlying the insulating layer 16 is either effectively n- or p-type. In the former case, a high resistance is presented, due to the presence of the reverse-biased p-n junction, to the flow of current in the load and litle current flows. In the latter case, a low resistance is presented and a relatively large current flows. Accordingly, bistable operation is permitted.

The mechanism by which the gate assembly operates in the manner described will be explained with reference to FIGS. 2A through 2C, which are energy level diagrams of layer 23 and gate assembly under different conditions of applied voltage to the terminal gate.

FIG. 2A shows the energy level diagram of the system in the initial quiescent state before any voltage pulse has been applied to electrode 19. In particular, solid line 25 shows the bottom of the conduction band and solid line 26 the top of the valence band as one passes from the n-type bulk of the semiconductive element through surface layer 23 and layers 16, 17, 18 and 19 of the gate assembly. In the insulating layers 16 and 18, lines 25 and 26 are widely spaced, corresponding to the large forbidden energy gap in insulators. In the semiconductor, lines 25 and 26 are relatively closer, corresponding to the narrower band energy gap. The Fermi level is depicted by the broken line 27, which coincides with solid lines 31 and 32 for the metal layers. Thermal equilibrium requires that the Fermi level be at the same energy throughout the system.

The presence of a positive voltage $V_a$ on electrode 19 results in the energy level diagram shown in FIG. 2B. The thickness of the insulating layers 16 and 18 and the magnitude of the applied voltage $V_a$ are so chosen that there is a transport of electrons from the semiconductor through layer 16 into metallic layer 17 by a field controlled electron transport mechanism, such as tunneling or internal tunnel-hopping, but there is insignificant exodus of such electrons which are trapped in layer 17. The excess electrons in layer 17 are shown depicted in the usual fashion as negative charges. This condition is met by choosing insulating layers 16 and 18 such that the ratio of dielectric constant $\epsilon_1/\epsilon_2$ (where $\epsilon_1$ and $\epsilon_2$ are the dielectric constants of the two layers, respectively) is small and/or the barrier height into layer 16 is smaller than into layer 18. Additionally, to insure trapping it is important that the thickness of the floating gate layer 17 is thicker than the hot electron range so that the transported electrons are substantially at the Fermi-level 31 of the layer before reaching insulating layer 18.

With the removal of the applied bias, the energy level of the system is as depicted in FIG. 2C. The electric fields in the insulating layers 16 and 18 are now too low to permit carrier transport across them; consequently the electrons remain trapped in floating gate 17. In particular, the trapped electrons, which tend to distribute themselves uniformly throughout the layer 17 will result in the layer effectively being at a negative potential. This is depicted in FIG. 2C by the elevation of line 31 relative to that of lines 27 and 32 whose level remains fixed. Accordingly, there will be drawn into underlying surface layer 23 of the semiconductive element positive charges to compensate for the excess electrons in the contiguous metal as shown, and such positive charges will effectively make surface layer 23 p-type. As a consequence, a barrier-free low-resistance path is provided between sources 12 and 13 and significant current flow therebetween and through the load 21 under the influence of source 20 is facilitated. So long as excess electrons are trapped in layer 17, this condition persists. Accordingly, the device remembers the application of a positive pulse to electrode 19 even after the termination of the pulse.

To store a given amount of charge, one can either increase the applied voltage or increase the charging time by increasing the pulse width, or both, for a given gate structure. Moreover, the lower the barrier height associated with insulating layer 16 the lower the applied voltage needed to achieve a given trapped charge. For example by use of silicon nitride instead of silicon dioxide for layer 16 one can operate with significantly lower applied voltages.

There is a charge loss which is controlled by the dielectric relaxation time of the sandwich structure, and this loss readily can be made quite low. If very long dielectric relaxation times are desired, it will be advantageous to employ organic insulators which typically have longer relaxation times than inorganic insulators.

The trapped electrons can be quickly removed from the metallic layer by the reverse process of applying an appropriate negative pulse to electrode 19. The argument employed above can be used in analogous fashion to establish that such action can reduce the number of electrons in the layer 17, whereby there is restored to n-type the underlying surface portion 23. As a consequence, the resistance between zones 12 and 13 becomes high because of the reverse-biased p-n junction in this path and, accordingly, the current in the load is low.

To discharge completely the floating gate, the voltage applied to the terminal gate should be about equal in magnitude and duration although opposite in polarity to the voltage applied for charging.

It should also be apparent that a net positive charge (loss of electrons) can be stored in the floating gate if the discharging voltage applied to the outer gate is appropriately chosen in polarity, magnitude and duration, whereby surface portion 23 is made more strongly n-type.

It should also be apparent that the transport of electrons through the thin insulating layer 16 may be facilitated by irradiation of the thin layer and the contiguous semiconductor with light or other radiant energy coincident with the application of the biasing pulse to increase the temperature or energy of the electrons in the semiconductor surface, effectively lowering the barrier for transport into the floating gate.

As has been discussed, to insure that the transport will occur into the metal layer 17 from the semiconductor but not out of the metal layer into electrode 19, advantageously the thickness of layer 16 is made thinner than that of layer 18 and its dielectric constant lower. The lower dielectric constant helps insure that the electric field is larger in layer 16 than in layer 18. In the embodiment described, layer 16 of silicon dioxide has a dielectric constant of about 4 and layer 18 of zirconium oxide has a dielectric constant of about 30.

The thickness of layer 17 is relatively unimportant so long as its thickness is greater than the hot electron range as discussed above. Moreover in some cases it may be desirable that layer 17 be not continuous since a discontinuous layer 17 minimizes the effect of pinholes in layer 16. However, if pinholes are not a serious problem, it is usually advantageous to have layer 17 continuous.

A device of the kind described above was made essentially as follows.

First, there was prepared a silicon crystal of appropriate n-type conductivity. Thereafter, a thin layer of silicon oxide was grown over the silicon surface in the way usual to the preparation of silicon insulated gate field effect transistors. By photolithographic techniques, holes were etched in the oxide and a p-type impurity diffused therein to form the source and drain zones. Then zirconium was deposited, typically by evaporation or sputtering, locally over the oxide layer extending betwen the diffused source and drain zones. The unit was then heated for the oxidation of the outer portion of the zirconium layer whereby the newly formed oxide layer served as the layer 18 and the unconverted zirconium served as the metal layer 17. Aluminum was evaporated selectively by suitable masking to serve as electrodes 14, 15 and 19.

It should be evident that the basic principles described have applicability to a wide variety of devices. For example in the device described, the crystal portion underlying the insulating layer 16 also could have been of initially p-type material so that current would normally flow between source and drain and the applied control voltage used to convert such portion toward n-type for the introduction of a high resistance to current flow between the source and drain.

In the device described, the operation of the gate assembly may be simulated by substituting for the floating gate 17, the relatively thick layer 18 and the terminal gate 19, an external capacitor of appropriate characteristics connected serially by electrical conductors between the relatively thin layer 16 and the control source. This effectively serves to form the gate assembly as a series combination of a tunnel sandwich diode and an external capacitor. In this case, it is important that the properties of the capacitor are such that upon application of a positive control pulse the electric field at the interface between the semiconductor and layer 16 permits the transport of electrons into layer 16 and that such electrons remain trapped there with insignificant leakage out by way of the capacitor. This principle can be extended to provide apparatus of the kind shown in FIG. 4.

In FIG. 3 the principles of the invention are shown extended to a "thin-film" transistor in which the various layers forming the device are deposited in turn on a suitable insulating substrate such as glass, in the manner now known to workers in the art. In particular, insulating substrate 30 has deposited therein a metallic film 31 which is to serve as the terminal gate electrode. This is then covered by the relatively thick insulating film 32 which will serve to isolate film 31 from the floating gate which is formed by metallic layer 33. This in turn is covered with a thinner insulating layer 34 over which is deposited a suitable homogeneous semiconductive film 35 as shown. Source and drain electrodes 36 and 37 are provided to opposed portions of the semiconductive film 35 and provision is made (not shown) to permit connection to metallic layer 31. By suitable masking, the configuration of the various layers is such that the terminal gate electrode 31 is suitably insulated from the floating gate 33 by layer 32 and the floating gate 33 is suitably insulated from the semiconductive layer by layer 34. With this configuration, it becomes especially convenient to provide access for the connection of additional circuitry, if this becomes desirable for additional control purposes, to the floating gate 33. Such access may be provided by leaving a portion of the corresponding layer exposed.

In this arrangement, voltages applied to the terminal gate electrode 31 are made to create an accumulation or depletion layer in the portion of the semiconductive film opposite the floating gate 33 whereby there is increased or decreased the resistance between source and drain electrodes 36 and 37.

Moreover, in each of the embodiments described, it is feasible to utilize incident radiation, such as light to provide an additional degree of control. In particular, for such purpose the thicker insulating layer is arranged to be photoconductive, as by being made of cadmium sulphide, and the outer gate electrode is made to be transparent to the incident radiation.

Under these circumstances, a charge trapped in the floating zone can leak off by way of the photoconductive layer if such layer is made conductive by photon irradiation. A reduction in the number of trapped charges obviously affects the underlying semiconductor appropriately. It should be apparent that there can readily be achieved an integrating effect of the number of incident photons, i.e., the number of charges leaking off and so the charge in the resistivity of the underlying semiconductor will be related to the total number of phontons incident since the floating gate was charged up. The charging up typically will be done in the dark and is essentially the same process as that described for the device shown in FIG. 1.

Additionally for some applications, it may be desirable to stack two or more floating gates separated from the semiconductive element and one another by relatively thin insulating layers through which electron transport is possible and the last of which is separated from the terminal gate by a relatively thicker insulating layer through which electron transport is not permitted. Similarly, it is feasible to insert side by side a pair of gate assemblies between the source and drain whereby various logic functions can be performed.

It is characteristic of the embodiments of FIGS. 1 and 3 that there is an effective upper limit on the voltage that can be employed between the source and drain and consequently the amount of current which may flow in the circuit connected therebetween. This restriction is posed by the fact that it is important to avoid pinchoff, which occurs if the reverse bias between the floating gate and drain becomes excessive.

As a consequence, for applications where fanout to a number of load branches is desired and so a relatively large flow of current between source and drain, it may be advantageous to employ an alternative arrangement which permits a higher operating voltage to be used between the source and drain. In particular, the problem of pinchoff is ameliorated by separating the gate assembly essentially into two separate parts and forming the tunnel sandwich diode extrenally to avoid use of the semiconductive element as one electrode. FIG. 4 illustrates one possible embodiment of this kind. First, there is provided an insulated gate field effect transistor 40 comprising a semiconductive element whose bulk 41 is n-type but includes spaced p-type zones 42 and 43 to which are connected source and drain electrodes 44 and 45, respectively. A gate electrode 46 is disposed over the semiconductor surface between the source and drain but insulated therefrom by the insulating film 47. The voltage source 48 and load 49 are connected between the source and drain. In the foregoing respects, the transistor is of a kind well known.

Additionally, the gate electrode 46 is connected to a metallic layer 50 which is sandwiched between insulating layers 51 and 52 which in turn are sandwiched between plates 53 and 54. In a manner analogous to the insulating layers of the gate assemblies associated with the devices shown in FIGS. 1 and 3, insulating layer 51 is thinner and of a lower dielectric constant than insulating layers 52 and 47. In this instance the layers 50, 51 and 53 form the tunnel sandwich diode.

In operation, a voltage provided by control source 55 is used to cause electron transport through insulating layer 51 into metal layer 50 where the charges become trapped, after the voltage is removed, by a mechanism similar to that previously discussed. The trapped charges redistribute themselves between electrode 46 and layer 50, but if these are suitably proportioned enough of the charge collects on layer 46 that it can give rise to an inversion layer in the semiconductor, and in accordance with the principles previously described this reduces the resistance of the path between source and drain whereby a relatively large current can flow.

It should also be apparent that the control voltage provided by the control source 55 can be impressed between layers 53 and 54 independent of the source electrode 44, i.e., the potential of electrode 53 need not be tied to the potential of the source electrode 44 as shown where both are tied to ground.

Additionally, while in the arrangement depicted the tunnel sandwich diode formed by layers 50, 51 and 53 is essentially in parallel with the control source 55 and the assembly formed by layers 50, 52 and 54, it is feasible to connect the tunnel sandwich diode in series with the control source and the gate electrode 46, eliminating the need for that formed by layers 50, 52 and 54, and depending on the insulating layer 47 to serve the role of the layer 52. For this series configuration, the charging voltage will have a polarity opposite that used in the parallel arrangement. This arrangement is depicted by a fragmentary view in FIG. 5 where the suffix A is used to designate elements corresponding to those of FIG. 4.

It should also be apparent that the invention will find principal utility in arrangement which incorporates a plurality of elements in large matrix arrays to provide increased memory. Typically in such arrays to facilitate accessing, the individual elements are disposed in two dimensional arrays in a coordinate fashion so that by selection of X and Y coordinates an individual element can be selected. One accessing technique feasible would involve: for writing pulsing and appropriate X gate line simultaneously with the appropriate Y source line to energize the element at the corresponding XY coordinate; for reading pulsing the appropriate X source line simultaneously with the appropriate Y drain line to detect the state of the element at the XY coordinate.

It should be apparent that the principles of the invention can be extended to other forms of semiconductive devices where it is desired to maintain an induced electric field even after the inducing force is removed. Typical of devices of this kind are those described in United States Patents 2,791,758 through 2,791,761.

Accordingly, it is to be understood that the embodiments described in detail are only illustrative of the general principles involved and other embodiments may be devised consistent with the spirit and scope of the invention.

What is claimed is:

1. Semiconductive apparatus comprising a semiconductive element having a pair of electrodes connected to spaced portions of the surface of said element, an insulating layer contiguous to the portion of said element intermediate between the pair of spaced electrodes, a gate electrode overlying said insulating layer for inducing electric fields in the underlying portion of the semiconductive element, and a separate control element comprising a conductive member sandwiched between a relatively thick insulating layer and a relatively thin insulating layer which in turn are sandwiched between a pair of electrodes adapted to have a voltage source connected therebetween, said sandwiched conductive member being connected electrically to said gate electrode.

2. Semiconductive apparatus exhibiting memory comprising:

an insulated gate field effect transistor comprising a semiconductive element and source, drain and insulated gate electrode connections thereto, an output circuit connected between the source and drain electrode connections, and an input circuit connected between the source and insulted gate including conductive means intermediate between a pair of insulating layers of different characteristics where charge carriers can be trapped to provide memory, the presence of trapped charge carriers being effective to affect the conductance of the channel between the source and drain electrodes in the semiconductive element.

3. Semiconductive apparatus which exhibits memory comprising:

a semiconductive element defining a channel for charge carriers, and means exhibiting memory for inducing in a portion of said channel an electric field for controlling the conductance of said channel comprising:

a first insulating layer contiguous to said element, a second insulating layer spaced from said element, a first conductive layer sandwiched between said first and second insulating layers for trapping therein charges, and a second conductive layer spaced from the first conductive layer by the second insulating layer to which there can be applied signal voltages to establish electric fields in the first and second insulating layers, the electron transport properties of the first and second insulating layers being different whereby signal voltages applied to said second conductive layer cause electron transport through only one of the two insulating layers.

4. Semiconductive apparatus in accordance with claim 3 in which the first insulating layer is relatively thin and the second insulating layer is relatively thick.

5. Semiconductive apparatus in accordance with claim 3 in which source and drain electrodes make connection to the semiconductive element on opposite ends of the portion in which the electric field is induced whereby the resistance between said connections can be affected by the electric field.

6. Semiconductive apparatus in accordance with claim 5 in which the source and drain electrodes make connection to portions of the element of one conductivity type and the portion intermediate such portions is of the opposite conductivity type.

7. Semiconductive apparatus in accordance with claim 4 in which the element is of silicon, the first insulating layer is taken from the group consisting of silicon oxide and silicon nitride, the first metallic layer is taken from the group consisting of aluminum and zirconium, and the second insulating layer is an oxide of the metal of the first metallic layer.

8. Semiconductive apparatus in accordance with claim 3 in which the second insulating layer is photoconductive.

9. Semiconductive apparatus in accordance with claim 3 in which the first conductive layer is discontinuous and free of terminal connections thereto.

10. Semiconductive apparatus comprising:

a semiconductive element having a pair of electrodes connected to spaced portions of the surface of said element, a first insulating layer contiguous to the portion of said element intermediate between the pair of spaced electrodes, a gate electrode overlying said insulating layer for inducing electric fields in the underlying portion of the semiconductive element, and a control element distinct from the gate electrode comprising:

a relatively thin second insulating layer sandwiched between a pair of metallic layers, one of which is connected to the gate electrode and the other adapted to be connected to a control source, the second insulating layer being thin enough to permit electron transport therethrough under the influence of voltages applied from the control source, the first insulating layer being thick enough to prevent electron transport therethrough of the electrons penetrating the second layer.

References Cited

UNITED STATES PATENTS

| | | | |
|---|---|---|---|
| 3,423,646 | 1/1969 | Cubert et al. | 317—234 |
| 3,384,794 | 5/1968 | Boyle | 317—235 |
| 3,418,493 | 12/1968 | Uzunoglu et al. | 307—238 |
| 3,267,389 | 9/1966 | Simmons | 330—37 |
| 3,365,584 | 1/1968 | Bragg | 307—211 |
| 3,397,325 | 9/1968 | Weimer | 307—251 |
| 3,296,508 | 1/1967 | Hofstein | 317—235 |
| 3,348,674 | 10/1967 | Diemer | 307—88.5 |

JOHN W. HUCKERT, Primary Examiner

MARTIN H. EDLOW, Assistant Examiner

U.S. Cl. X.R.

307—211; 340—173